Figure 1:
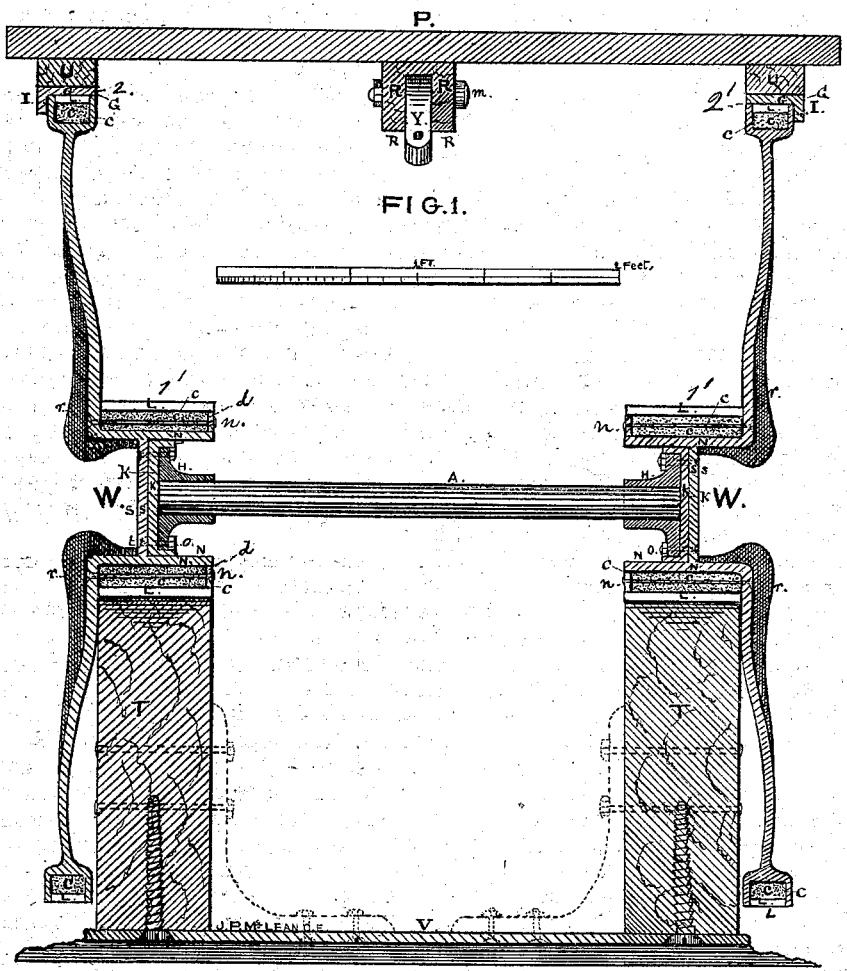

J. FRYE.

Wheels for Endless Railways.

No. 136,053. Patented Feb. 18, 1873.

WITNESSES:

INVENTOR:

UNITED STATES PATENT OFFICE.

JESSE FRYE, OF BROOKLYN, NEW YORK.

IMPROVEMENT IN WHEELS FOR ENDLESS RAILWAYS.

Specification forming part of Letters Patent No. 136,053, dated February 18, 1873.

*To all whom it may concern:*

Be it known that I, JESSE FRYE, of the city of Brooklyn, in the county of Kings and State of New York, have invented a new and useful Double-Bearing Noiseless Railroad-Car Wheel; and I hereby declare the following to be a full, clear, and exact description thereof, reference being had to the accompanying drawing, which is lettered to correspond with and form a part of the same; and in order that the public may fully understand the nature of my said invention, and those skilled in the mechanic arts to construct the same, I will describe it, as follows, to wit:

Figure 1 is a vertical section, through the center, of my new flexible double-bearing railroad-car wheels W W, arranged upon wooden ways or tracks T T secured and held in three places by the angle-iron ties V or otherwise secured in a rigid or fixed position. A is the axis, firmly secured in the hubs H H, which fits into the flanged plate K K, which sits into the sleeve N N of the hub of the wheel, which is vertically divided by a dividing-plate, S S, that forms a part of the sleeve N and holds the flanged plate K and hub H in position by means of bolts O O, or the same may be otherwise secured so that the axle A and hub H may be removed for repairs or for other causes in the shortest space of time, at little or no expense. C C C C C C are cork packings overlaid with hardened-leather tires L L L L, the said cork being secured upon the sleeves N by means of longitudinal rods $n\ n\ n\ n$, which pass through and are riveted to the vertical face of the metallic rings $d\ d$ and face-plates of the wheels W W, which are also provided with a number of ribs, $r\ r$, diverging from the center of the wheel to the outer periphery or platform-bearings I I, and these bearings are also provided with cork packing C and hardened-leather tires L L in the grooves of the outer platform-bearings I of the wheels W. The platform is represented by a vertical section at P, and is provided with two ways, U U, upon the under side thereof, with angle-iron bearings G G to receive the leather tires L L of the noiseless wheels W.

My endless platform P is provided with a longitudinal rib, R R, which is provided with a knuckle-joint coupling, Y, to connect the continuous sections of my endless platforms or carriers P throughout the entire line of endless railways.

My invention is not confined to flexible tires or bearings alone, but I construct the wheels W with either flexible or rigid bearings 1 1' and 2 2', in the form substantially as described.

By fashioning the individual parts of my double-bearing flexible railroad-car wheels W, as shown in the drawing, a more light and noiseless wheel is produced, yet it is perfectly rigid in all its metallic parts, to resist any lateral or vertical pressure; and by the construction of two bearing-peripheries, 1 and 2, the former to operate upon the wooden or other rails T T and the latter to propel the endless sectional platforms or carriers P over the top of the wheels at four or more times the velocity of the wheel itself upon the tracks or tramways T T, I believe to be new and of great public utility.

Hence, the novelty of my invention consists in the construction of the wheels W, ribbed or otherwise and provided with sleeves N divided at the center thereof into two open circular chambers by the vertical plates S S, which are a part of the sleeves N N, and are used to secure the adjustable hubs H in a rigid and substantial manner to the wheels W by means of bolts O O or otherwise, so that the said wheels may be removed from the axle-tree A with dispatch, to be replaced by others in case of breakage, &c. Another point of novelty is the construction of the wheels W with two bearings of different diameters packed with cork or analogous packing secured by hard-leather tires L and bolts $n$, or with two rigid bearings, if preferred; also, propelling the platforms P upon the larger flexible or rigid bearings, 1 or 2, at a quadruplicate or greater speed, to the lesser bearings of the wheels W upon the ways T T; therefore,

What I claim as new and useful, and wish to protect by Letters Patent of the United States, are—

1. The wheels W, with two bearings, 1 1' and 2 2', either flexible or rigid, in combination with the sleeve or hub-chambers N N, with the dividing-partitions S S and adjustable flanged plates K K, to receive the adjustable hubs H H, all secured by means of the bolts O O, or otherwise, for railroads, turn-tables, draw-bridges, or analogous uses.

2. In combination with the wheel W, the elastic packing C and flexible or rigid bearing 1', all arranged and operating substantially as described.

3. The diverging ribs $r\ r$, to support the face-plates of the double-bearing wheels W, all arranged and combined substantially in the manner and for the ostensible purpose set forth.

In testimony whereof I hereunto subscribe my name in the presence of two witnesses.

JESSE FRYE.

Witnesses:
JAMES P. McLEAN, C. E.,
J. RITCHIE McLEAN.